INVENTOR:
BERNARD R. BARANSKI

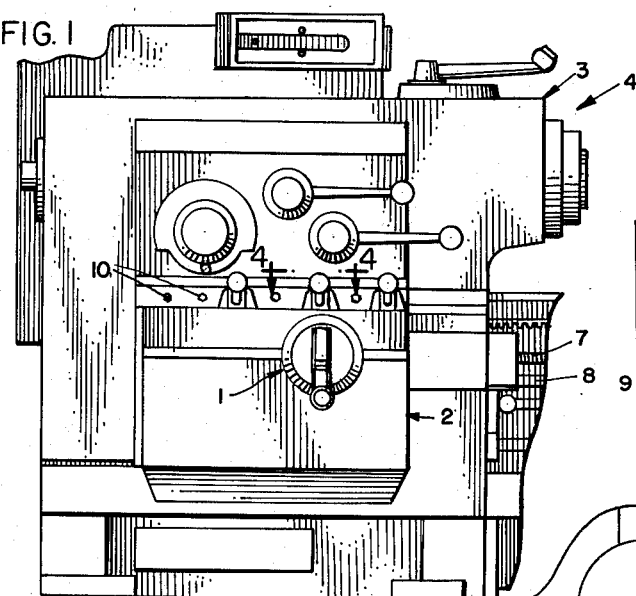

INVENTOR:
BERNARD R. BARANSKI

March 7, 1961 B. R. BARANSKI 2,973,657
GEAR SHIFTING MECHANISMS
Filed Oct. 8, 1959 5 Sheets-Sheet 4
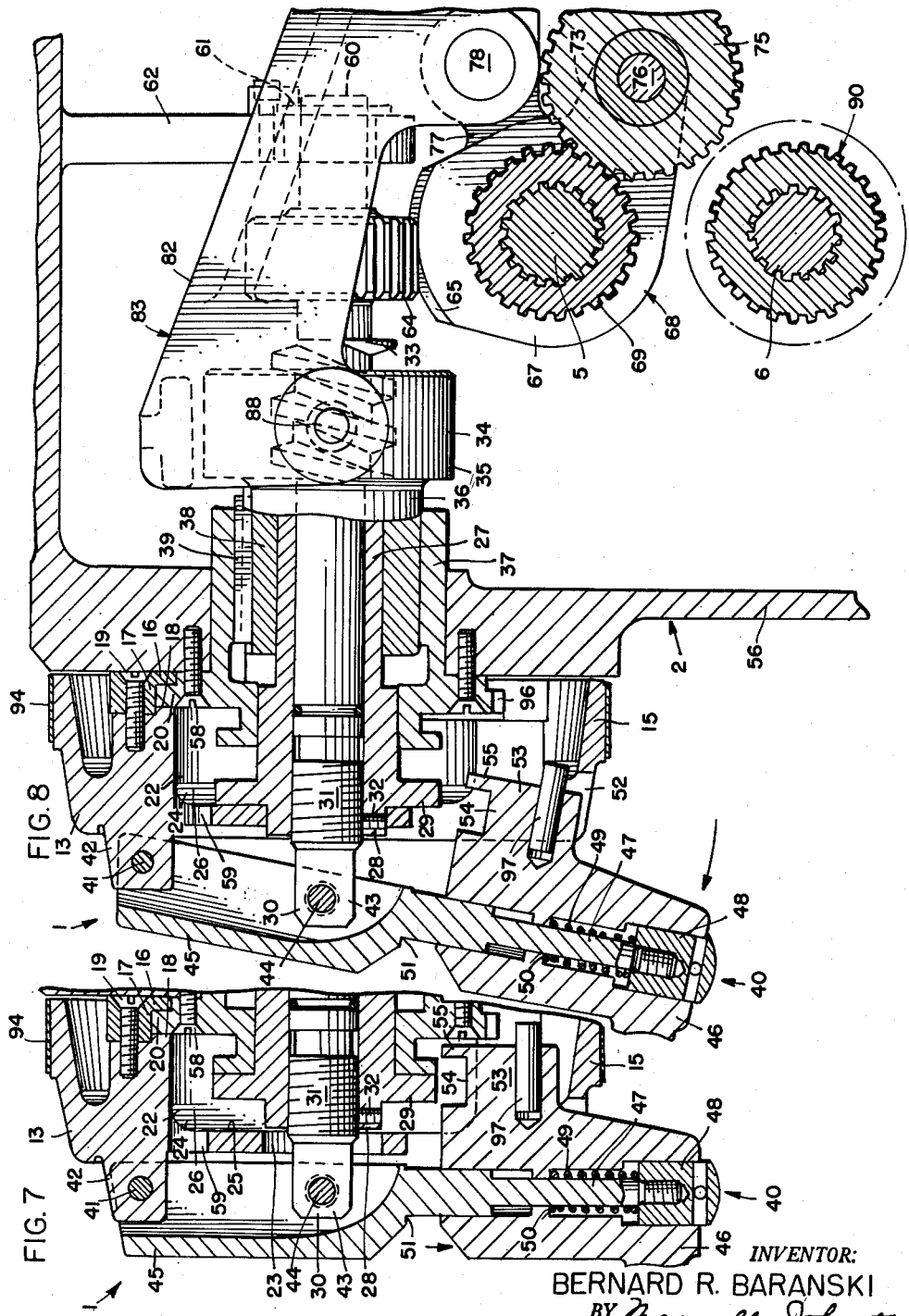
INVENTOR:
BERNARD R. BARANSKI
BY Marshall, Johnston,
Cook & Root
ATT'YS

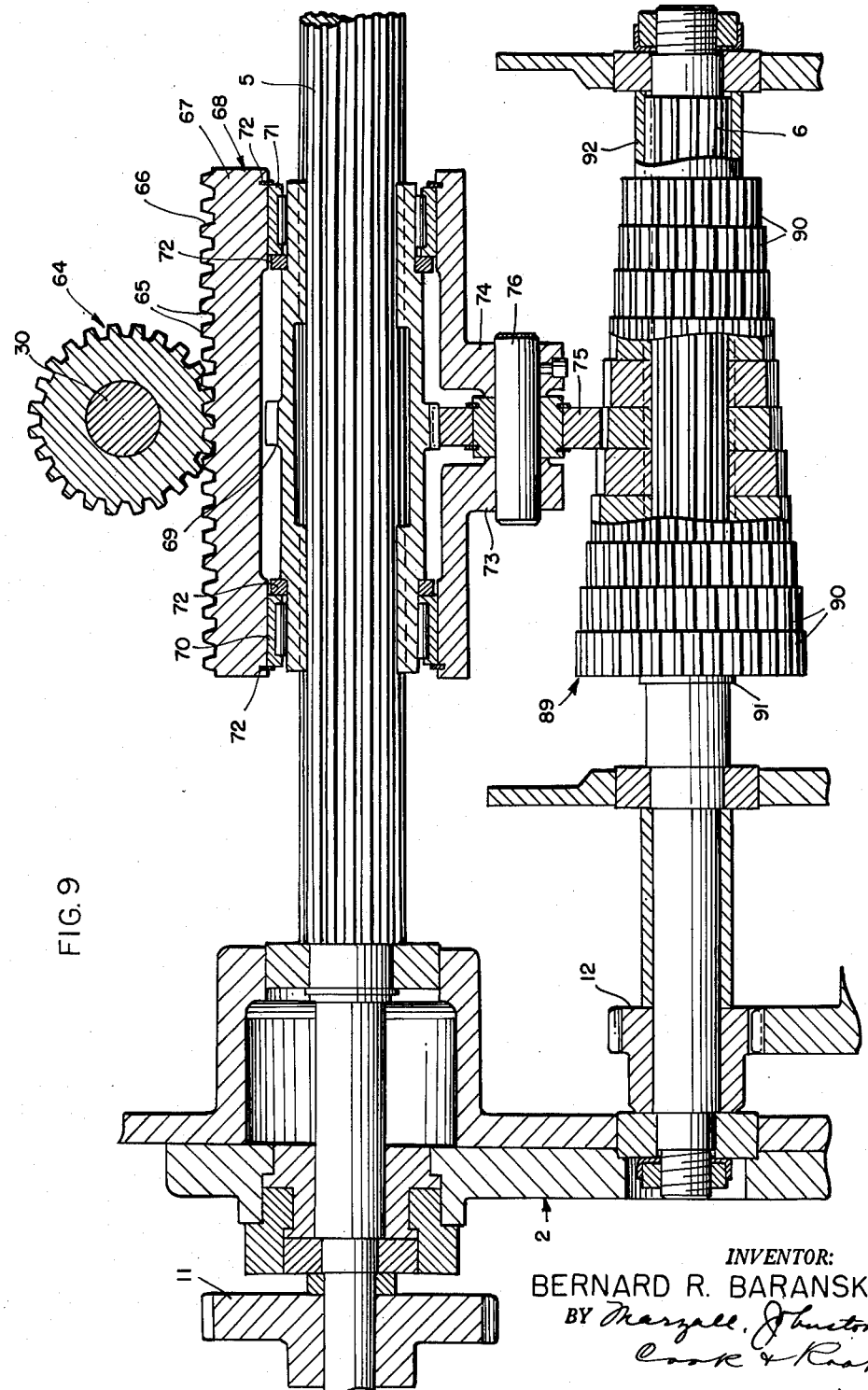

United States Patent Office 2,973,657
Patented Mar. 7, 1961

2,973,657

GEAR SHIFTING MECHANISMS

Bernard R. Baranski, Chicago, Ill., assignor to U.S. Industries, Inc., New York, N.Y., a corporation of Delaware Filed Oct. 8, 1959, Ser. No. 845,282

10 Claims. (Cl. 74—348)

This invention relates to gear shifting mechanisms and, more particularly, to gear shifting mechanisms which are particularly well adapted for shifting gears in the feed gear box of a lathe, or the like.

It is a primary object of the present invention to afford a novel gear shift mechanism whereby gears within a closed housing may be quickly and easily shifted by an operator from outside of the housing.

Another object of the present invention is to provide a novel gear shifting mechanism of the aforementioned type which may be used in lathes, and the like, for shifting gearing in the feed gear boxes thereof in a novel and expeditious manner.

Gear shifting mechanisms for shifting gearing in the feed gear boxes of lathes, and the like, from outside of the gear boxes, have been heretofore known in the art. However, such gear shifting mechanisms as have been heretofore known in the art have had several inherent disadvantages such as, for example, requiring unclosed openings in the gear boxes; not enabling a gear box construction to be afforded which could be effectively sealed against the passage of dirt and dust thereinto; and against the leakage of lubricant, and the like, therefrom; being large and cumbersome in size; being difficult to operate, install, or service; being inefficient and unreliable in operation; or being difficult and expensive to manufacture, and the like. It is another important object of the present invention to enable such disadvantages to be overcome in a novel and expeditious manner.

Another object of the present invention is to afford a novel gear shifter which is effective to shift a tumbler gear or idler gear selectively into proper meshing engagement with each of the gears of a conical cluster of gears in a novel and expeditious manner.

Another object is to afford a novel gear shifting mechanism of the aforementioned type which is effective to dispose and positively hold a tumbler gear or idler gear in proper engagement with each individual gear which may be selected in a stepped gear mechanism.

A further object is to provide a novel gear shifting mechanism of the aforementioned type which is so constructed that indicia for indicating the selected positioning of the gearing to be shifted may be afforded thereon in a novel and expeditious manner effective to readily and accurately indicate to the operator the selection being made.

Yet another object of the present invention is to afford a novel gear shifting mechanism of the aforementioned type which may be quickly and easily mounted in and removed from an engine lathe, or the like.

Another object is to afford a novel gear shifting mechanism of the aforementioned type wherein gyratory movement and longitudinal movement of a tumbler gear or idler gear to be shifted may be effected in a novel and expeditious manner relative to a fixed shaft.

Yet another object of the present invention is to provide a novel gear shifter mechanism of the aforementioned type wherein the gear shifting operations thereof may be effected by relatively simple pivotal movements of a single handle.

A further object of the present invention is to afford a novel gear shifting mechanism of the aforementioned type which is practical and efficient in operation and may be readily and economically produced commercially.

Other and further objects of the present invention will be apparent from the following description and claims and are illustrated in the accompanying drawings which, by way of illustration, show the preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a front elevational view of the head stock of an engine lathe embodying a gear shifter embodying the principles of the present invention;

Fig. 2 is a front perspective view of a portion of the head stock shown in Fig. 1;

Fig. 3 is an enlarged fragmentary front elevational view of the gear shifter shown in Fig. 1;

Fig. 4 is an enlarged fragmentary top plan view of the gear shifter shown in Fig. 1, looking in the direction of the arrows 4—4 in Fig. 1;

Fig. 7 is a detail sectional view of a portion of the gear shifter shown in Fig. 5, with certain parts thereof disposed in different positions;

Fig. 8 is a fragmentary detail sectional view of a portion of the gear shifter shown in Fig. 5, with certain parts disposed in different positions; and Fig. 9 is a fragmentary detail sectional view taken substantially along the line 9—9 in Fig. 5, with certain parts omitted.

Figure 5:
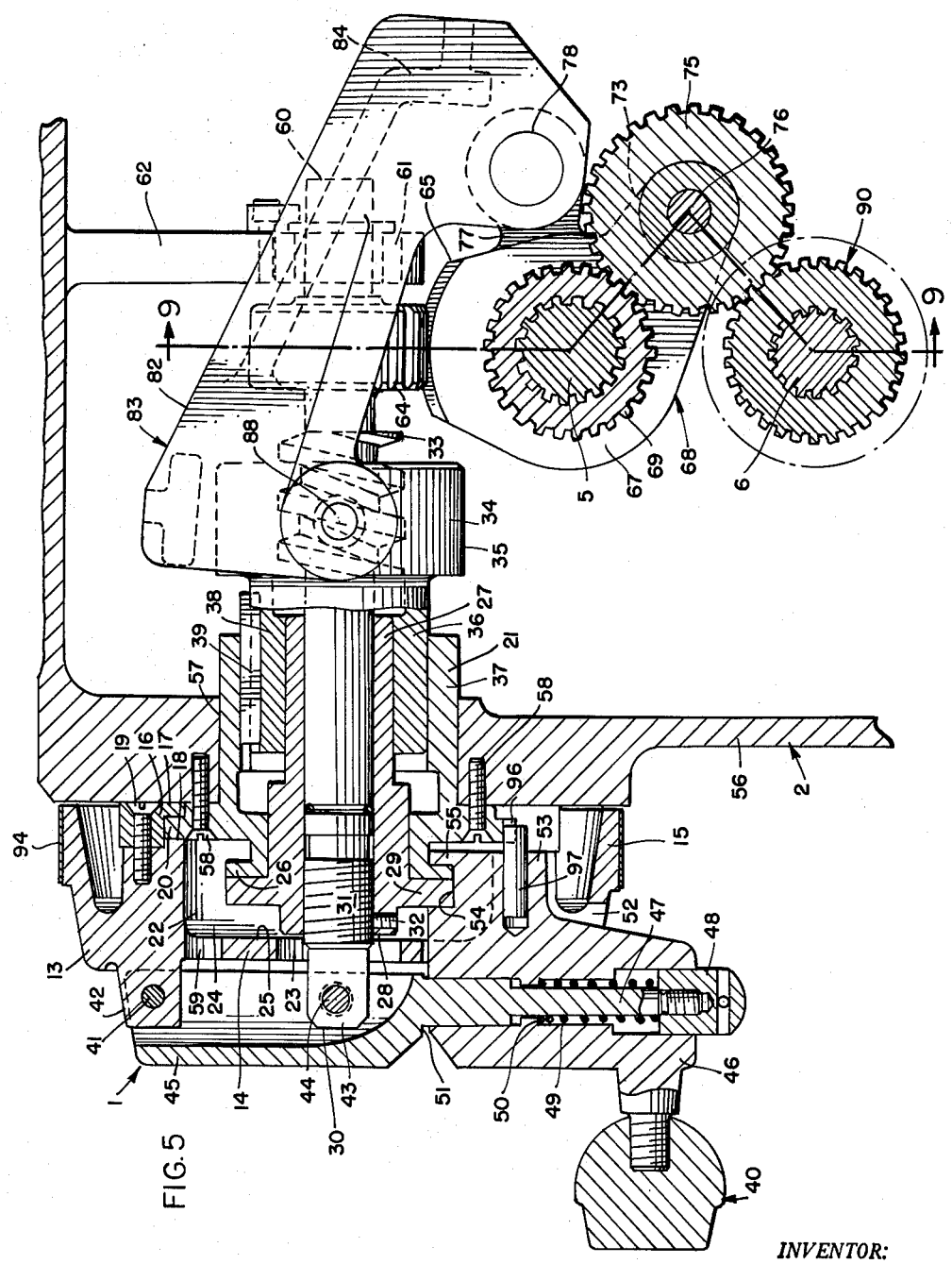
Fig. 5 is a detail sectional view taken substantially along the line 5—5 in Fig. 3.

A gear shifter 1 embodying the principles of the present invention is shown in the drawings to illustrate a preferred embodiment of the present invention.

The gear shifter 1 is shown in the drawings mounted in an open-backed gear box or housing 2 in the head stock 3 of an engine lathe 4 in position to change the gear ratio between the drive shaft 5 and a driven shaft 6 and thereby change the speed of rotation of the lead screw 7 and the feed rod 8 of the lathe 4.

The housing 2, Figs. 1 and 2, has a removable end wall 9, and is secured to the front face of the remainder of the head stock 3 by suitable means such as bolts 10 in position to dispose the drive shaft 5 in such position that a gear 11 mounted thereon and secured thereto, Fig. 9, is disposed in operative engagement with drive mechanism, not shown, in the head stock 3 so that the drive shaft 5 may be driven thereby. The position of the housing 2 on the head stock 3 is also such that a gear 12, mounted on and secured to the driven shaft 6, Fig. 9, is disposed in driving engagement with suitable drive mechanism, not shown, disposed between the driven shaft 6 and the lead screw 7 and feed rod 8, Fig. 1, so that upon rotation of the driven shaft 6 the lead screw 7 and the feed rod 8 are rotated thereby.

It will be appreciated by those skilled in the art that although I have illustrated my novel gear shifter as being mounted in an engine lathe, this is merely by way of illustration, and not by way of limitation, and it may be embodied in other mechanism without departing from the purview of my invention.

The gear shifter 1 includes a substantially round cup-shaped cap or cover member 13, Figs. 3, 4, 5, and 6. The cap 13 embodies a substantially flat, circular-shaped front wall 14, from the outer peripheral edge of which an annular flange 15 projects rearwardly, Figs. 5 and 6. A retaining ring 16 having a radially inwardly projecting flange 17 is secured to the rear face 18 of the flange 15 by suitable means such as screws or bolts 19. The inwardly projecting flange 17 on the retaining ring 16 is disposed in overlying relation to an outwardly projecting flange 20 on an elongated sleeve 21, in position to clamp the flange 20 against the rear face 18 of the cap 13, Fig. 5.

Figure 6:
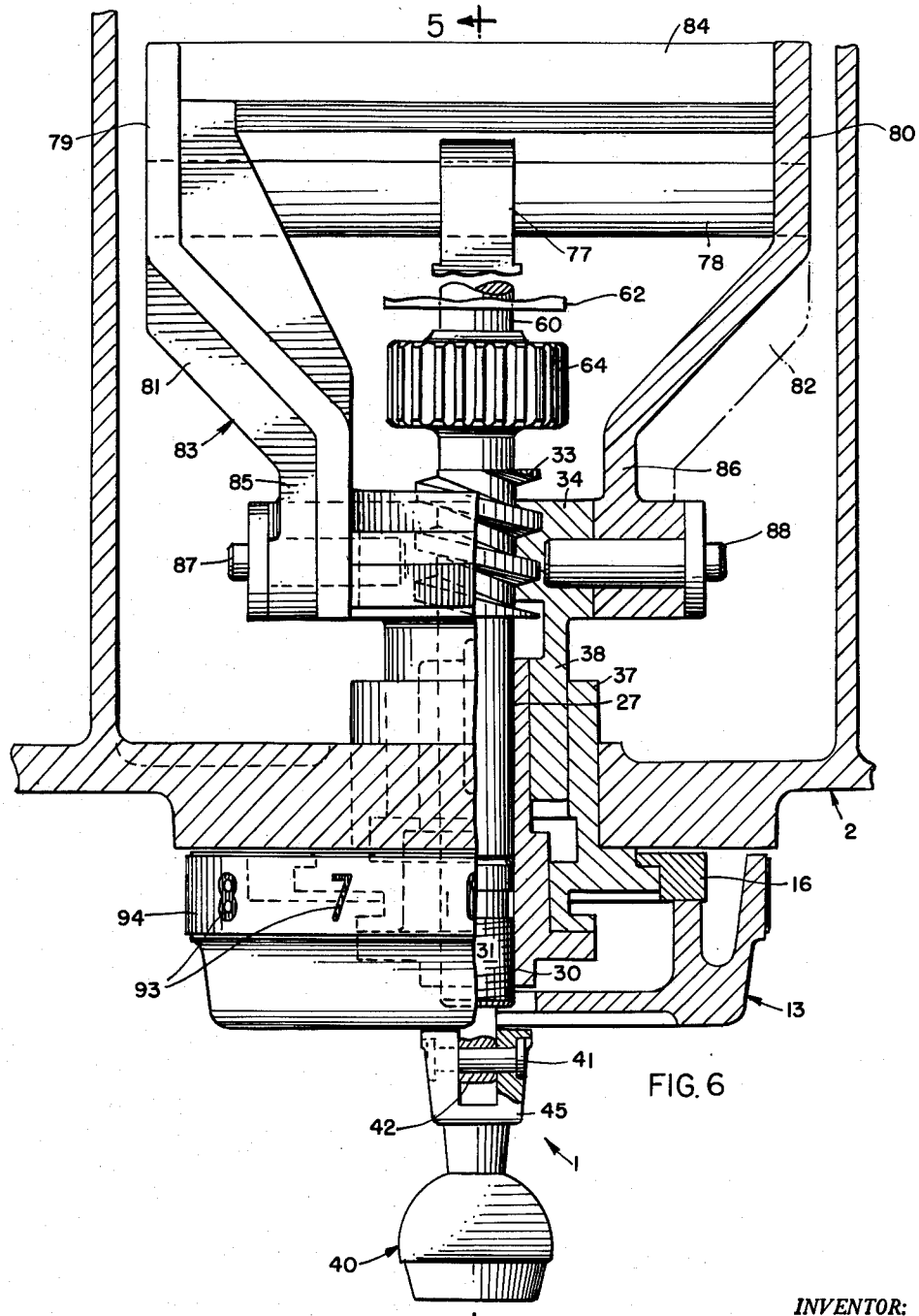
Fig. 6 is a detail sectional view taken substantially along the line 6—6 in Fig. 3.

The cap 13 has an opening 22 extending axially through the radial center thereof, Figs. 5 and 6. The opening 22 has a front end portion 23 and a rear end portion 24, with the rear end portion 24 being substantially larger in transverse cross-sectional size than the front end portion 23 to thereby afford a rearwardly facing shoulder 25 between the end portions 23 and 24, Figs. 5 and 6. The sleeve 21 has a radially outwardly projecting flange 26 on the front end portion thereof, Figs. 5 and 6, the flange 26 being spaced from the flange 20 in parallel relation thereto, and being disposed in the rear end portion 24 of the opening 22 for a purpose which will be discussed in greater detail presently.

Another sleeve 27 is slidably mounted in the sleeve 21 and has a front end portion 28 which is complementary in cross-sectional size to the end portion 23 of the opening 22. The sleeve 27 has a radially outwardly projecting flange 29 disposed rearwardly of the end portion 28, and the sleeve 27 is normally disposed in the sleeve 21 in the position shown in Fig. 5, wherein the flange 29 is disposed in juxtaposition to the flange 26 and in rearwardly spaced relation to the shoulder 25, with the end portion 28 also disposed in rearwardly spaced relation to the end portion 23 of the opening 22.

An elongated screw 30 having threads 31 on the front end portion thereof is mounted in and extends through the sleeve 27, with the threads 31 threadedly engaged with the sleeve 27, Figs. 5 and 6. The screw 30 and the sleeve 27 may be adjusted longitudinally relative to each other by rotation of the screw 30 in the sleeve 27, and may be held in adjusted position to each other by suitable means such as a screw 32, Fig. 5.

The screw 30 has other threads 33 formed thereon rearwardly of the sleeve 27, Figs. 5 and 6, and a nut 34, having a body portion 35 and a forwardly projecting sleeve portion 36, is mounted on the screw 30 with the body portion 35 disposed in operative threaded engagement with the threads 33, and with the sleeve portion 36 projecting forwardly into the sleeve 21 between the rear end portion 37 of the sleeve 21 and the rear end portion 38 of the sleeve 27, Fig. 5. The sleeve portion 36 of the nut 34 is non-rotatably secured to the sleeve 21 by suitable means such as a key 39, Fig. 5, for a purpose which will be discussed in greater detail presently.

An elongated handle 40 is pivotally mounted at one end by a pin or bolt 41 on an ear 42 projecting forwardly from the front face 14 of the cap 13, Figs. 5 and 6. The ear 42 is disposed at one side of the face 14, and the handle 40 is so disposed thereon that it extends from the ear 42 across the face 14 in overlying relation to the front end portion 43 of the screw 30. The front end portion 43 of the screw 30 projects into the handle 40 and is secured thereto by suitable means such as a pin or bolt 44 whereby upon pivotal movement of the handle 40 around the pin 41 forwardly and rearwardly relative to the cap 13, the screw 44 may be reciprocated forwardly and rearwardly through the sleeve 21 as will be discussed in greater detail presently.

The handle 40 includes an elongated body member 45, one end of which is pivotally connected by the pin 41 to the ear 42, Fig. 5. The handle 40 also includes an end portion 46 which is slidably mounted on the other end portion 47 of the body portion 45. A retaining member 48 is attached to the free end portion of the end portion 47, and a compression coil spring 49 is disposed in the end portion 46 between a shoulder 50 formed thereon and the retaining member 48 in position to yieldingly urge the end portion 46 of the handle 40 along the end portion 47 toward the pin 41, the shoulder 51 on the handle 40 affording an abutment member limiting movement of the end portion 46 toward the pin 41.

The cap 13 has an opening 52 formed in the front wall 14 substantially diametrically opposite the ear 42. The end portion 46 of the handle 40 has a rearwardly projecting boss 53 formed thereon, and the boss 53 is so disposed on the handle 40 that when the handle 40 is disposed in normal position, such as shown in Fig. 5, the boss 53 is disposed in the opening 52. The boss 53 has a recess 54 formed therein in position to afford a flange 55 which normally projects toward the longitudinal axis of the screw 30 in position to underlie the flange 36 on the sleeve 21 to thereby releasably hold the handle 40 in the aforementioned normal position relative to the cap 13, as shown in Fig. 5. The recess 54 is of such size that when the flange 55 is disposed in the aforementioned underlying relation to the flange 26, the flanges 26 and 29 are disposed in the recess 54 with a relatively close sliding fit.

If it is desired to pivot the handle 40 forwardly around the pin 41 from the normal position shown in Fig. 5 to the forwardly disposed position shown in Fig. 8, the end portion 46 may be moved outwardly away from the pin 41 against the urging of the spring 49 into the position shown in Fig. 7, to thereby move the flange 55 radially outwardly of the flange 26, after which the handle 40 may then be pivoted in a clockwise direction, as viewed in Fig. 7, around the pin 41 from the position shown in Fig. 7 to the position shown in Fig. 8. It will be noted that during this pivotal movement of the handle 40, the screw 30 is moved forwardly therewith, and, the sleeve 27 being secured to the screw 40, it is also moved forwardly therewith. During this forward movement of the sleeve 27, the front end portion 28 thereof moves into the front end portion 23 of the opening 22 in the cap 13, and the flange 29 moves into abutting juxtaposition to the shoulder 25, as shown in Fig. 8.

The construction of the novel gear shifter 1 is such that it may be readily mounted on a suitable portion of a lathe, or the like, such as, for example, on the front wall 56 of the housing 2, with the cap 13 and the handle 40 disposed in readily accessible position on the front face of the wall 56, and with the sleeve 21 projecting rearwardly through a suitable opening such as the opening 57 in the wall 56, Figs. 2, 5 and 6. The sleeve 21 may be releasably secured to the wall 56 by suitable means such as screws 58 extending through the flange 20 on the sleeve 21 and threadedly engaged in the wall 56, Fig. 5. The screws 58 may be inserted into the wall 56 prior to the mounting of the handle 40 on the cap 13 so that the screws 58 are accessible through suitable openings such as an opening 59 and the opening 52, Fig. 5.

The sleeve 21 and the retaining ring 16 are so disposed relative to each other that when the sleeve 21 is attached to a wall such as the wall 56 in the manner shown in Fig. 5, the cap 13 and the retaining ring 16 are rotatable around the sleeve 21. It will be remembered that the handle 40 is mounted on the cap 13 and, therefore, it will be seen that the handle 40 and the cap 13 are rotatable as a unit around the longitudinal axis of the screw 30, and the handle 40 is thereby effective to rotate the screw 30 around its longitudinal axis when the handle 40 and the cap 13 are so rotated.

In the gear shifter 1 shown in the drawings, the inner or rear end portion 60 of the screw 30 is journalled in a suitable bearing 61 mounted in an inwardly projecting boss or flange 62 in the housing 2, Figs. 5 and 6. Between the flange 62 and the teeth 33, a gear 64 is mounted on and secured to the screw 30 for rotation therewith. The gear 64 is in mesh with the teeth 65 of an elongated rack 66 extending longitudinally along one side of a substantially tubular-shaped body portion 67 of a gear 69 splined to the drive shaft 5 for rotation therewith, Figs. 5 and 9. The gear 69 is journalled in bearings 70 and 71 in the body portion 67 of the mounting bracket 68, and is secured therein against longitudinal movement relative thereto by suitable means such as retaining rings 72.

Two ears 73 and 74, Figs. 5 and 9, project radially outwardly from one side of the body portion 67 of the mounting bracket 68 at an obtuse angle to the teeth 65, and in spaced, substantially parallel relation to each other, Figs. 5 and 9. A gear 75 is rotatably mounted on a pin 76 extending therethrough and mounted in the ears 73 and 74. The gear 75 is disposed in such position on the bracket 68 that the gear 75 is meshed with the gear 69 in all operative positions of the bracket 68 relative to the gear 69.

Another ear 77 projects from the body portion 67 of the bracket 68 between the rack 66 and the ears 73 and 74, Figs. 5 and 6. The ear 77 is slidably mounted on a rod 78 extending between and secured to the rear end portions 79 and 80 of the two side legs 81 and 82, respectively, of a bracket or yoke 83 in the gear shifter 1, Figs. 5 and 6.

The bracket 83 is of a somewhat modified U-shape, having an intermediate leg 84 extending between and secured to the rear end portions 79 and 80 of the legs 81 and 82, respectively, rearwardly and in substantially parallel relation to the rod 78, Fig. 6. The bracket 83 is open at its front end, and the front end portions 85 and 86 of the legs 81 and 82, respectively, are pivotally connected to the body portion 35 of the nut 34 on substantially diametrically opposite sides thereof by suitable means such as pins or trunnions 87 and 88, respectively.

As may be seen in Figs. 5 and 9, a stepped gear drive in the form of a plurality of gears 90 disposed in a conical cluster 89 is mounted on the driven shaft 6 for rotation therewith, the cluster 89 being retained in proper position on the shaft 6 against longitudinal movement relative thereto by suitable retaining means such as a retaining ring 91, and a spacer 92. The gears 90 are all of equal thickness and diminish uniformly in diameter from the larger end of the cluster 89 to the smaller end thereof in such a manner that the outer corners of each gear facing in the direction of the diminishing size of the cluster are disposed in a true frusto-conical shape relative to each other.

The drive shaft 5 and the driven shaft 6 are disposed in parallel relation to each other, and the bracket 68 is normally so disposed on the drive shaft 5 that the gear 75 carried thereby is meshed with one of the gears 90 of the cluster 89. The gear shifter 1 is so constructed and is so disposed in the housing 2 that it may be actuated to readily selectively shift the idler gear 75 into and out of meshing engagement with each of the gears 90.

Thus, for example, when the handle 40 of the shifter mechanism 1 is disposed in normal closed position such as shown in Fig. 5, the idler gear 75 is disposed in engagement with one of the gears 90 such as, for example, the middle gear as shown in Fig. 9. This, of course, affords a driving connection from the drive shaft 5 through the gear 69, the idler gear 75, the middle gear 90, to the driven shaft 6, so that rotation of the drive shaft 5 is effective to rotate the driven shaft 6 at a predetermined speed. If it is desired to increase or decrease the speed of rotation of the driven shaft 6, this may be readily accomplished by actuating the gear shifter 1 to shift the idler gear 75 to the right or left, as viewed in Fig. 9, into mesh with the proper other one of the gears 90.

In the operation of the gear shifter 1, the operator may readily effect such shifting of the idler gear 75 by first grasping the end portion 46 of the handle 40 and moving it longitudinally from the position shown in Fig. 5 to the position shown in Fig. 7 to thereby free the flange 55 from its latching engagement by the flange 26. Thereafter, the handle 40 may be swung forwardly into the position shown in Fig. 8. It will be remembered that this forward movement of the handle 40 is effective to correspondingly move the screw 30 forwardly in the sleeve 21 to the position wherein the flange 29 engages the shoulder 25, as shown in Fig. 8. Such forward movement of the screw 30 is effective to move the nut 34 forwardly and thereby move the bracket 83 forwardly. This latter forward movement of the bracket 83 is effective to pivot the bracket 68 around the drive shaft 5 in a counterclockwise direction, as viewed in Fig. 5, from the position shown in Fig. 5 to the position shown in Fig. 8. This pivotal movement of the bracket 68 is effective to swing the idler gear 75 radially outwardly of the gear cluster 89 to a position wherein it is disposed radially outwardly of the driven shaft 6 a distance greater than the radius of the largest gear 90 of the cluster.

Thereafter, the operator may turn the handle 40 in either a clockwise or counterclockwise direction, as viewed in Fig. 3, around the longitudinal axis of the screw 30 to thereby correspondingly rotate the dial 13 and the screw 30. The nut 34 being held against rotation by the sleeve 21, the threads 33 are effective to cause it to move rearwardly or forwardly longitudinally along the screw 30 by the threads 33 during such rotation of the screw 30, depending on whether the rotation of the screw 30 is in the aforementioned clockwise or counterclockwise direction, respectively. This movement of the nut 34 is effective to move the bracket 83 rearwardly or forwardly, depending upon the direction of movement of the nut 34, to thereby swing the bracket 68 in a clockwise or counterclockwise direction, respectively, around the drive shaft 5 and thereby move the idler gear 75 radially inwardly or outwardly, respectively, relative to the gear cluster 89.

It will be remembered that the gear 64, which is rotatable with the screw 30, is engaged at all times with the rack 66 on the mounting bracket 68 and, therefore, it will be seen that the rotation of the screw 20 is effective to move the bracket 68 longitudinally of the drive shaft 5 and, therefore, longitudinally of the gear cluster 89, simultaneously with the gyratory movement of the bracket 68 relative to the drive shaft 5 occasioned by movement of the nut 34 longitudinally of the screw 30.

After the idler gear 75 has been moved into radial alignment with the newly selected one of the gears 90, by the movement of the bracket 68 along the drive shaft 5, the handle 40 may then be moved rearwardly on the pin 41 into its normal latching engagement with the flange 26, as shown in Fig. 5, to again move the screw 30 rearwardly and thereby, through the connection of the nut 34 with the bracket 68 by the bracket 82, to swing the bracket 68 in a clockwise direction, as viewed in Fig. 5, into position to mesh the idler gear 75 with the newly selected one of the gears 90.

The pitch of the teeth 64 and 65 is such that somewhat less than one complete rotation of the dial 13 and the handle 40 around the longitudinal axis of the screw 30 is effective to move the idler gear 75 between radial alignment with the opposite end gears 90 of the cluster 89. Also, the pitch of the threads 33 and the spacing of the teeth 64 and 65 is such that the movement of the idler gear 75 from each one of the gears 90 into position to properly engage the next adjacent gear is effected by an equal amount of rotation of the dial 13 and the handle 40 around the longitudinal axis of the screw 30 for each adjacent pair of gears.

To facilitate the selection of the gear 90 to be engaged by the idler gear 75, suitable indicia such as, for example, numbers 93, Figs. 4 and 6, may be placed on the outer peripheral face 94 of the flange 15 of the dial 13. A suitable indicator such as, for example, a notch 95 may be provided on the housing 2 to indicate the position which the dial 13 and the handle 40 occupy. A plurality of notches 96 are formed in the outer peripheral edge of the flange 20 of the sleeve 21, Figs. 3 and 5, and a pin 97 is mounted in and projects rearwardly from the boss 53 of the handle 40 in position to be engaged in a respective one of the notches 96 when the dial 13 is disposed in the corresponding position indicated by one of the numerical indicia 93, and the handle 40 is disposed in normal latched position as shown in Fig. 5. The positioning of the pin 97 in the handle 40 is moved outwardly into the position shown in Fig. 7, the pin 97 is moved radially outwardly out of the notch 96 with which it was engaged.

It will be seen that with the gear shifter 1 constructed in the manner disclosed herein, the idler gear 75 is disposed in proper meshing engagement with each of the gears when the handle 40 and the dial 13 has been rotated to the proper position to engage the idler gear 75 with that respective gear, and the handle 40 has been returned to its normal latched position as shown in Fig. 5.

Also, it will be seen that the idler gear 75 is effectively latched in proper engagement with the selected gear 90 when the handle 40 is disposed in its aforementioned normal latched position.

With the novel gear shifter 1 constructed in the aforementioned manner, it will be seen that the dial 13 and the handle 40 may be disposed outwardly of a completely closed housing and still afford a practical and efficient device for quickly and easily shifting a stepped-gear type of drive mechanism disposed in the housing.

Also, it will be seen that the novel gear shifter 1 embodies a construction which affords effective sealing against the leakage of oil so that lubrication of the working parts disposed in a housing in which it is mounted such as, for example, the housing 2, may be afforded without the danger of oil leaking from the gear shifter mechanism.

It will also be seen from the foregoing that my invention affords a novel gear shifter which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A gear shift mechanism comprising a conical cluster of gears disposed in axial alignment with each other, a drive shaft disposed in parallel relation to said cluster, another gear mounted on said shaft and rotatable therewith, said gear being slidable axially of said shaft, a mounting bracket rotatably mounted on said shaft and slidable with said other gear axially of said shaft with said gear, an idler gear rotatably mounted on said bracket and carried thereby for oscillation around said shaft in constant driven engagement with said other gear, and means for selectively moving said idler gear into engagement with respective ones of said first mentioned gears, said means including a slidably and rotatably mounted elongated shaft, a nut non-rotatably mounted on said elongated shaft and operatively engaged therewith for movement longitudinally thereof upon rotation of said elongated shaft, said nut being movable with said elongated shaft upon sliding movement of the latter, and another bracket operatively connected between said first mentioned bracket and said nut in position to rotate said first mentioned bracket and said idler gear around said drive shaft upon said sliding movement of said elongated shaft, said other bracket being operatively connected to said elongated shaft for movement thereby longitudinally of said cluster upon said rotation of said elongated shaft.

2. A gear shift mechanism comprising a conical cluster of gears disposed in axial alignment with each other, a drive shaft disposed in parallel relation to said cluster, another gear mounted on said shaft and rotatable therewith, said gear being slidable axially of said shaft, a mounting bracket rotatably mounted on said shaft and slidable with said other gear axially of said shaft with said gear, an idler gear rotatably mounted on said bracket and carried thereby for oscillation around said shaft in constant driven engagement with said other gear, and means for selectively moving said idler gear into engagement with respective ones of said first mentioned gears, said means including a slidably and rotatably mounted elongated shaft, a nut non-rotatably mounted on said elongated shaft and operatively engaged therewith for movement longitudinally thereof upon rotation of said elongated shaft, said nut being movable with said elongated shaft upon sliding movement of the latter, another bracket operatively connected between said first mentioned bracket and said nut in position to rotate said first mentioned bracket and said idler gear around said drive shaft upon said sliding movement of said elongated shaft and upon said longitudinal movement of said nut relative to said elongated shaft, and a gear mounted on and rotatable with said elongated shaft, said last mentioned gear being drivingly engaged with said first mentioned bracket for moving the latter axially of said drive shaft upon rotation of said elongated shaft.

3. In a drive mechanism embodying a rotatably mounted driven shaft, a plurality of gears mounted on said shaft and drivingly engaged therewith, a drive shaft rotatably mounted in parallel relation to said driven shaft, and means for selectively drivingly connecting said drive shaft to respective ones of said gears, said means including a bracket mounted on said drive shaft and rotatable therearound and slidable axially thereof, the combination of an elongated screw, said screw being rotatable around its longitudinal axis and slidable along its longitudinal axis, a nut mounted on said screw and threadedly engaged therewith for movement longitudinally thereof upon said rotation of said screw, said nut being movable with said screw axially of the longitudinal axis of the latter, another bracket pivotally connected to said nut and said first mentioned bracket in position to rotate said first mentioned bracket around said drive shaft upon movement of said nut along the longitudinal axis of said screw, a gear mounted on said screw for movement therewith, said last mentioned gear being operatively engaged with said first mentioned bracket in position to move the latter axially of said drive shaft upon said rotation of said screw, and means for rotating and longitudinally sliding said screw.

4. The combination in a drive mechanism as defined in claim 3, and in which said means for rotating and sliding said screw comprises a supporting member rotatable around the longitudinal axis of said screw, and an elongated handle mounted on and carried by said supporting member for rotation therewith, said handle being pivotally connected to said supporting member for oscillation relative thereto generally axially of said screw, said handle being pivotally connected to said screw in position to slide said screw axially upon said oscillation of said handle and to rotate said screw and supporting member around said axis of said screw upon rotation of said handle around said axis.

5. The combination in a drive mechanism as defined in claim 4, and which includes a stationary holding member, and in which said handle includes an end portion movable longitudinally of said handle into and out of latching engagement with said holding member to thereby hold said handle against oscillation and free said handle for said oscillation, respectively.

6. A gear shift mechanism for lathes, and the like, comprising a driving shaft, a driven shaft disposed in substantially parallel relation to said driving shaft, a conical cluster of gears mounted on said driven shaft for rotation therewith, an idler gear between said driving shaft and said cluster and operatively connected at all times to said driving shaft for rotation thereby, means mounting said idler gear on said driving shaft for both a gyratory and longitudinal movement relative thereto, an elongated screw, a handle connected to said screw in position to move said screw longitudinally upon movement of said handle in one direction and to rotate said screw upon movement of said handle in another direction, and means connecting said screw to said first mentioned means for gyrating said first mentioned means and said idler gear upon movement of said handle in said one direction and gyrating and simultaneously moving said first mentioned means and said idler gear longitudinally of said driving shaft upon movement of said handle in said other direction, said second mentioned means including a nut mounted on and threadedly engaged with said screw and pivotally connected to said first mentioned means for gyrating the latter upon said longitudinal movement and said rotation of said screw, and a gear mounted on and rotatable with said screw and operatively engaged with said first mentioned means for moving the latter longitudinally of said driving shaft upon said rotation of said screw.

7. A gear shift mechanism for lathes, and the like, comprising a driving shaft, a driven shaft disposed in substantially parallel relation to said driving shaft, a conical cluster of gears mounted on said driven shaft for rotation therewith, an idler gear between said driving shaft and said cluster and operatively connected at all times to said driving shaft for rotation thereby, a bracket mounting said idler gear on said driving shaft for both gyratory and longitudinal movement relative thereto, an elongated screw, a handle connected to said screw in position to move said screw longitudinally upon movement of said handle in one direction and to rotate said screw upon movement of said handle in another direction, and means connecting said screw to said bracket for gyrating said bracket and said idler gear upon movement of said handle in said one direction and gyrating and simultaneously moving said bracket and said idler gear longitudinally of said driving shaft upon movement of said handle in said other direction, said means including a nut mounted on and threadedly engaged with said screw, an elongated bracket pivotally connected at one end to said nut and pivotally connected at the other end to said first mentioned bracket for gyrating said first mentioned bracket and said idler gear upon both said longitudinal movement and said rotation of said screw, and a gear mounted on and rotatable with said screw and operatively engaged with said first mentioned bracket for moving the latter and said idler gear longitudinally of said driving shaft upon said rotation of said screw.

8. A gear shift mechanism as defined in claim 6, and which includes a dial extending around said screw, and in which said handle is pivotally mounted on said dial for rotation relative thereto during said movement of said handle in said one direction, and in which said dial is rotatable with said screw and said handle around the longitudinal axis of said screw during said movement of said handle in said other direction.

9. A gear shift mechanism as defined in claim 6, and which includes a fixed sleeve mounted around said screw, and in which said handle has an end portion movable between inwardly and outwardly disposed positions relative to the remainder of said handle, said sleeve having a radially outwardly projecting flange disposed in position to latchingly engage said end portion and thereby hold said handle against movement in said one direction when said end portion is disposed in said inwardly disposed position, said flange being disposed out of latching engagement with said end portion when said end portion is disposed in said outwardly disposed position.

10. A gear shift mechanism for lathes, and the like, comprising a driving shaft, a driven shaft disposed in substantially parallel relation to said driving shaft, a conical cluster of gears mounted on said driven shaft for rotation therewith, an idler gear between said driving shaft and said cluster and operatively connected at all times to said driving shaft for rotation thereby, a bracket mounting said idler gear on said driving shaft for both gyratory and longitudinal movement relative thereto into and out of driving engagement with predetermined gears of said cluster, an elongated screw, a fixed sleeve mounted around said screw, an elongated handle connected to said screw in position to move said screw longitudinally upon movement of said handle in one direction and to rotate said screw around its longitudinal axis upon movement of said handle in another direction, said handle having an end portion movable longitudinally between inwardly and outwardly disposed positions, said sleeve having a radially outwardly projecting flange disposed in position to latchingly engage said end portion and thereby hold said handle against movement in said one direction when said end portion is disposed in said inwardly disposed position, said flange being disposed out of latching engagement with said end portion when said end portion is disposed in said outwardly disposed position to thereby free said handle for said movement in said one direction, a dial extending around said screw in covering relation to said sleeve, said handle being pivotally mounted on said dial for rotation relative thereto during said movement of said handle in said one direction, said dial being rotatable with said screw and said handle around the longitudinal axis of said screw during said movement of said handle in said other direction, and means connecting said screw to said bracket for gyrating said bracket and said idler gear upon movement of said handle in said one direction and simultaneously moving said bracket and said idler gear longitudinally of said driving shaft upon movement of said handle in said other direction, said means including a nut mounted on and threadedly engaged with said screw, an elongated bracket pivotally connected at one end to said nut and pivotally connected at the other end to said first mentioned bracket for gyrating said first mentioned bracket and said idler gear upon both said longitudinal movement and said rotation of said screw, and a gear mounted on and rotatable with said screw and operatively engaged with said first mentioned bracket for moving the latter and said idler gear longitudinally of said driving shaft upon said rotation of said screw.

References Cited in the file of this patent
UNITED STATES PATENTS

| 2,662,417 | Mascherpa | Dec. 15, 1953 |
| 2,911,842 | Romi | Nov. 10, 1959 |